Patented Sept. 26, 1939

2,174,111

UNITED STATES PATENT OFFICE 2,174,111

METHOD OF REACTING AROMATIC HYDROCARBONS

Cortes F. Reed, Anoka, Minn., assignor of one-half to Charles L. Horn, Minneapolis, Minn.

No Drawing. Application May 25, 1936, Serial No. 81,781

6 Claims. (Cl. 260—505)

This invention relates to a novel method of forming substitution products from aromatic compounds and has particular reference to a novel and improved method of reacting upon aromatic hydrocarbons, particularly benzene.

The present invention and application is a continuation in part of my application filed December 29, 1933 for Method of halogenating compounds and product resulting therefrom, Serial No. 704,591 which was allowed March 24, 1936, now Patent No. 2,046,090 dated June 30, 1936.

It is well known that free chlorine acts sluggishly upon benzene, but that the action is accelerated by iodine, molybdenum chloride, $MOCl_5$, and ferric chloride. Another well known method for the preperation of chlorobenzenes and aromatic halogen derivatives consists in the transformation of the diazo-compounds. The latter are obtained from the amido-bodies, which are the nitro-reduction products. In the decomposition of the diazo-body, the chlorine enters the position which the diazo-, the amido-, and the nitro-group previously held. Paradichlorbenzene can also be made by the action of phosphorus pentachloride upon paraquinone.

The primary object of the present invention is to provide a novel and improved method of forming benzene derivatives directly in the presence of an oxide of the group consisting of sulfur, selenium, and tellurium, while controlling the temperature of the reaction to prevent polymerization.

Another object is to provide a method of preparing chlorobenzene substitution products, particularly the chlorbenzenes which shall give a high yield of the product and require a minimum number of steps in the preparation thereof.

A still further object is to provide a novel and improved method of forming benzene substitution products which shall be inexpensive to carry out, easy to control, and wherein the tendency of the benzene being halogenated to polymerize may be easily avoided.

The foregoing and other objects and advantages will become more apparent as the description proceeds, and will be pointed out in the appended claims.

As disclosed in my aforementioned application, I have discovered that when compounds of either the aliphatic or aromatic series are treated or reacted with a mixture of sulphur dioxide and one of the halogens in gaseous form, as for example, chlorine, these two gases appear to react with each other to form compounds containing sulphur, oxygen and chlorine.

In practicing my invention, benzene, at substantially room temperature, 60°–80° F. or approximately 15°–25° C. is reacted with a mixture of one of the halogens in gaseous form, and an oxide of an element of the group consisting of sulfur, selenium, and tellurium. Sulfur dioxide is preferred due to economic reasons and also because it is more active than the oxides of the other two elements, hence in the following description, sulfur dioxide will be used in the examples. Any of the halogens seem to react similarly and in the description hereinafter chlorine will be used, although it will be understood that bromine, fluorine or iodine may be used equally well.

Sulfur dioxide and chlorine are bubbled through benzene which at the start of the reaction may be at substantially room temperature in the ratio of two for chlorine and one for sulfur dioxide by volume. Approximately ½ hour after starting the gas flow, the product of reaction reached the saturation point in the mother liquid and began to crystallize out in the bottom of the container. During the reaction, which is exothermic, the temperature is controlled in any suitable manner. When the temperature is maintained between 0–20° C., the end product is believed to be para-chlor-benzene-chlor-sulfite; between 20° and 70° C., a mixture of this product and appears to be paradichlorbenzene, and above 70° C., polymerization products. When the temperature of the reaction is maintained nearer to 20° C., there will be more para-chlor-benzene-chlor-sulphite present in the mixture of this product and paradichlorbenzene, and the nearer to 70° C., there will be more paradichlorbenzene present in this mixture. The product is separated from the mother liquid by decantation, filtration or wringing. When it is desired to make only the sulfite substitution product, the mother liquor is used again with additions of fresh benzene, or if the dichlor product is desired, it is produced either in a similar manner or the unconverted benzene is removed by distillation. The efficiency of the reaction is approximately 95% of the theoretical.

In the above reactions, the following approximate ratios were used: 80 parts of benzene, 150 parts of chlorine and 70 parts of sulfur dioxide.

From my experments and research work, it appears that sulfur dioxide and chlorine form almost entirely para compounds, as the quantities of ortho and meta compounds are so small as to be entirely negligible. In addition to the paradichlorbenzene, there also appears to be formed chlor-benzene-parachlorsulfite, paradichlordiphenyl or sometimes known as paradichlordibenzene. All of the above are found and in solution in the unacted portion of the benzene along with monochlorbenzene.

What I claim is:

1. The method which comprises reacting an aromatic hydrocarbon with a vapor mixture of a halogen and a dioxide of an element of the group consisting of sulfur, selenium and tellurium.

2. The method which comprises reacting an aromatic hydrocarbon with a vapor mixture of chlorine and sulfur dioxide.

3. The method which comprises reacting benzene with a vapor mixture of chlorine and sulfur dioxide.

4. The process which comprises reacting an aromatc hydrocarbon with a vapor mixture of about 2 parts of chlorine and 1 part of sulfur dioxide.

5. The method which comprises passing a vapor mixture of chlorine and sulfur dioxide into an aromatic hydrocarbon which is initially at about room temperature, limiting the temperature of the reaction to about 70° C. and continuing the passage of the mixture into the reaction medium until crystalline products are precipitated.

6. The method which comprises passing a vapor mixture of about 2 parts of chlorine and 1 part of sulfur dioxide into benzene which is initially at about room temperature, limiting the temperature of the reaction to about 70° C. and continuing the passage of the mixture into the reaction medium until crystalline products are precipitated.

CORTES F. REED.